US005745116A

United States Patent [19]
Pisutha-Arnond

[11] Patent Number: 5,745,116
[45] Date of Patent: Apr. 28, 1998

[54] INTUITIVE GESTURE-BASED GRAPHICAL USER INTERFACE

[75] Inventor: Suthirug Num Pisutha-Arnond, Wheeling, Ill.

[73] Assignee: Motorola, Inc., Schaumburg, Ill.

[21] Appl. No.: 711,236

[22] Filed: Sep. 9, 1996

[51] Int. Cl.$^6$ .................................................. G06F 15/00
[52] U.S. Cl. .................... 345/358; 345/358; 345/352; 345/353; 345/354
[58] Field of Search ................................ 345/326, 327, 345/328, 335, 337, 338, 339, 340, 347, 348, 349, 352, 353, 358, 354

[56] References Cited

U.S. PATENT DOCUMENTS

| 4,803,474 | 2/1989 | Kulp | 340/709 |
|---|---|---|---|
| 5,384,910 | 1/1995 | Torres | 345/352 |
| 5,386,568 | 1/1995 | Wold et al. | 395/700 |

OTHER PUBLICATIONS

Evan Graham, DSI Datotech Systems, Inc., "White Paper Dato Patented Pointing Gesture System", Aug. 1996, pp. 1–20.

*Primary Examiner*—Matthew M. Kim
*Assistant Examiner*—Huynh Ba
*Attorney, Agent, or Firm*—Sylvia Chen; Rolland R. Hackbart

[57] ABSTRACT

A user performs a manual selection or a gesture selection of a screen object (210, 220, 230) on a screen (150) of an electronic device (100) using a pointing device (190). After a manual selection, such as a single tap, the electronic device (100) automatically presents a temporary directional palette (450) having palette buttons (451, 452, 453, 454, 455) that explicitly state functions of the electronic device (100). Each palette button has a unique compass direction relative to the original tap area. By making a second tap on a desired palette button, a novice user learns available functions of the electronic device (100) and their corresponding directional gestures. Alternately, the user may perform a gesture selection of both a screen object and a function, such as making a double tap or drawing a line in the appropriate direction, before the directional palette appears on the screen (150).

16 Claims, 5 Drawing Sheets

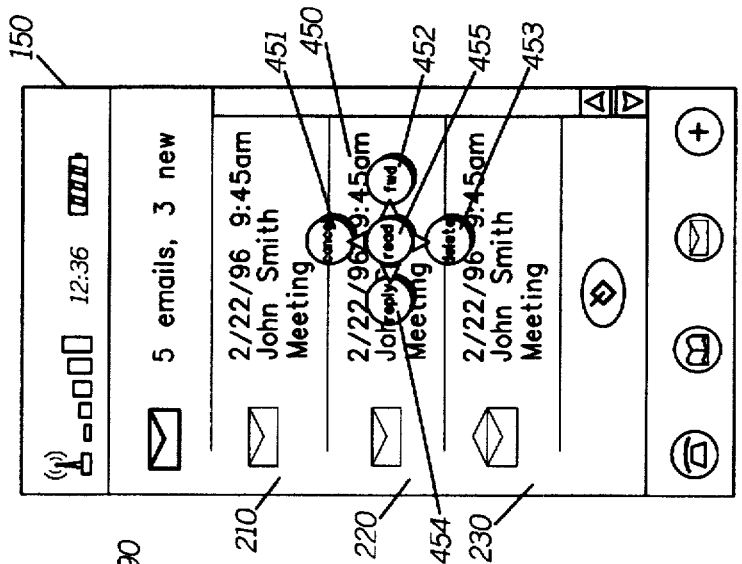
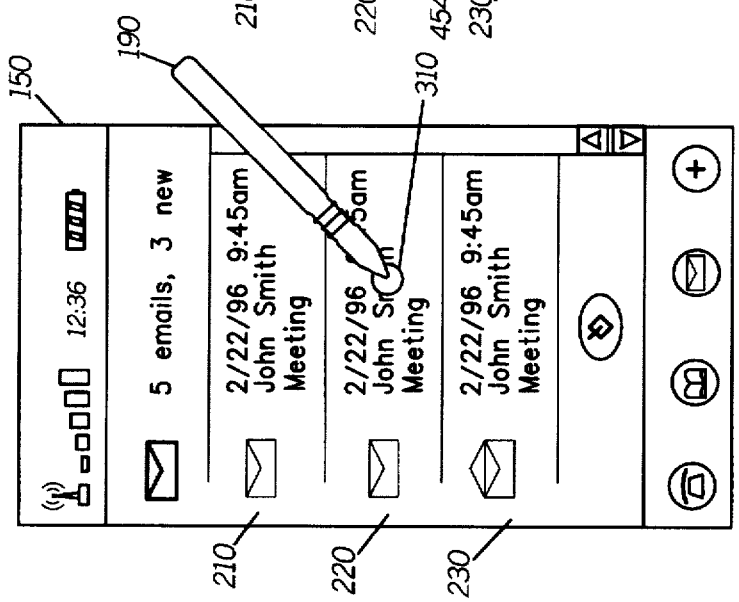
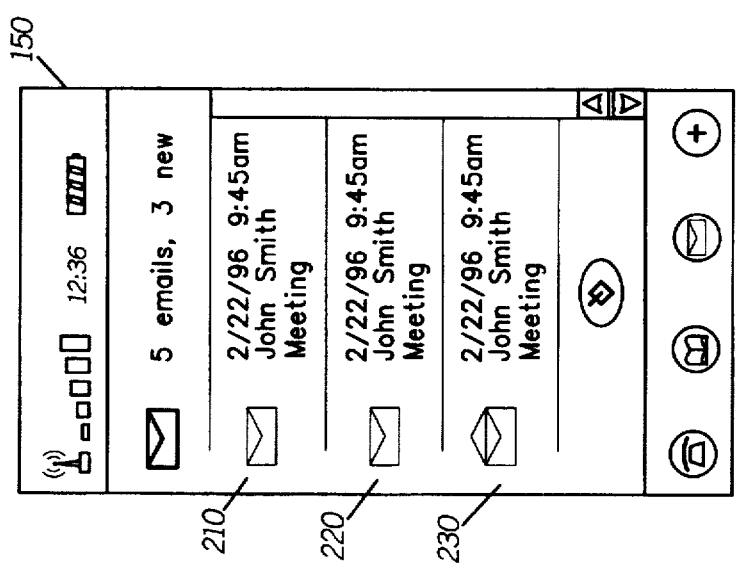

INTUITIVE GESTURE-BASED GRAPHICAL USER INTERFACE

FIELD OF THE INVENTION

This invention relates generally to user interfaces, and more particularly to graphical user interfaces that allow gestures.

BACKGROUND OF THE INVENTION

Generally, a graphical user interface uses linear menus, screen buttons, and a pointing device, such as a mouse, joystick, or touch-pad, to control an electronic machine such as a computer or computer-controlled appliance. The pointing device selects an area of the screen to indicate a desired function and then a selection button, such as a mouse button, commands implementation of that function. In order for a user to know what functions are available, the linear menus and screen buttons explicitly state or iconically show their functionality on a continuous basis, which reduces the amount of display space available to present other information to the user. To minimize the screen space taken by the linear menus and screen buttons, pull-down or other submenus may list collateral choices and present additional functions upon selection of a main menu item.

Several pen- or stylus-based electronic products have adopted "gesture" user interfaces as shortcuts for performing frequently-used functions. Gestures, however, are available only as an addition to conventional linear menu and screen button graphical user interfaces, thus the problem of reduced screen space remains in both types of user interfaces. Through simple, learned motions, gesture user interfaces allow quick access to functions. For example, instead of using a pointing device to select characters to be deleted and depressing a "delete" button, a user could simply strike through words (from left to right) using the stylus and they would be deleted. Unfortunately, most of the gestures available are not nearly as intuitive as this deletion example. Also, the gesture shortcuts are radically different from the linear menu and screen button methods of achieving the same function.

Thus, these gesture user interfaces are meant to be used only by expert users. Novice users have no way of easily ascertaining what gestures are available. The novice user must first go through a process of learning available gestures and their functionality from user documentation or on-screen "help" documentation and then memorizing these gestures. If a gesture is forgotten, the user must make a concerted effort to return to the documentation to relearn the gesture and its function. Consequently, there is a need for an easy-to-learn gesture-based user interface that allows users to quickly access frequently-used functions on an electronic machine and yet avoid the inconvenience of documentation. Also there is a demand for a gesture-based user interface that reduces the need for linear menus and screen buttons which consume display space.

SUMMARY

An intuitive gesture-based graphical user interface allows users to learn quickly gestures as a method of accessing frequently-used functions of a computer or computer-based appliance. The intuitive gesture-based graphical user interface also reduces the need for screen buttons that decrease available display space. Preferably, the intuitive gesture-based graphical user interface is implemented using a pen- or stylus-based device, and the user performs a manual selection of a screen item by tapping, or drawing a point, on a touch-sensitive screen using the stylus. After a single tap, the device would present a directional palette with palette buttons having different compass directions relative to the center of the directional palette. Each palette button explicitly displays a unique identifier representing a function or other item of information. By making a manual section of a desired palette button, such as a second tap, the novice user learns available functions of the device and their corresponding gestures. As the user grows more familiar with the electronic device, a user may tap twice in succession on a screen object or draw a line in an appropriate compass direction originating from a selected screen object, and the device would process this gesture selection appropriately without the directional palette appearing.

BRIEF DESCRIPTION OF THE DRAWINGS

FIG. 2 shows details of the screen of the electronic device shown in FIG. 1 according to a preferred embodiment.

FIG. 3 shows details of the screen shown in FIG. 2 when a user performs a manual selection of a screen object according to a preferred embodiment.

FIG. 4 shows details of the screen shown in FIG. 2 when a directional palette appears according to a preferred embodiment.

DETAILED DESCRIPTION OF THE PREFERRED EMBODIMENT

Figure 1:
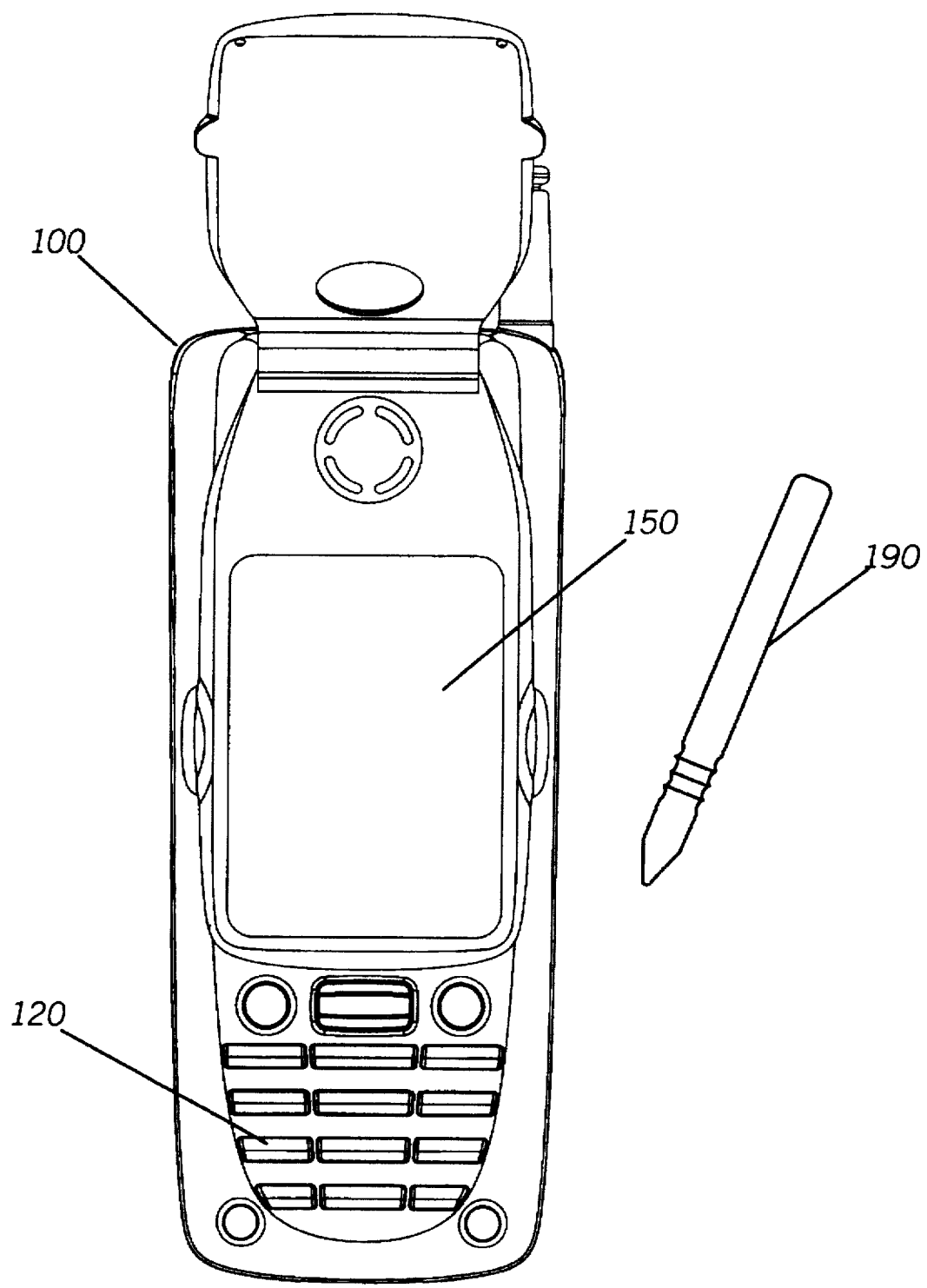
FIG. 1 shows a diagram of an intuitive gesture-based graphical user interface according to a preferred embodiment as implemented on an electronic device.

FIG. 1 shows a diagram of an intuitive gesture-based graphical user interface according to a preferred embodiment as implemented on an electronic device. Electronic device 100 is preferably a computer or other microprocessor-based appliance. In this diagram, electronic device 100 is shown as an integrated wireless communication device with radio-telephone, electronic mail, and facsimile features; however, electronic device 100 could be a desktop computer or a portable computer with a MODEM (modulator/demodulator), a television/VCR combination, a facsimile machine, a photocopy machine, a personal digital assistant, or the like. Electronic device 100 has a touch-sensitive screen 150 and push buttons 120. A pointing device 190 such as a pen or stylus interacts with the screen 150 to select areas of the screen. Of course, another pointing device, such as a mouse, joystick, touch-pad, or even human finger, could be substituted for a pen or stylus.

FIG. 2 shows details of the screen of the electronic device shown in FIG. 1 according to a preferred embodiment. This screen displays one or more screen objects 210, 220, 230, such as a list of received messages in an electronic mailbox, as directed by the microprocessor. A screen object is a graphical representation of data. Although an electronic mail software program is used in this example, many other programs may be substituted with other types of screen objects, such as an address book program with an alphabet index as screen objects, a scheduling program with calendar dates as screen objects, a memo or to-do program with list items as screen objects, an electronic game with directional buttons as screen objects, or electronic programs suitable for functions such as photocopying or facsimile transmission.

There are two methods of selecting a screen object and an associated function. A manual selection of a screen object, such as a tap or a drawing of a point, automatically brings up a directional palette with palette buttons having explicit identifiers to indicate functions corresponding to the manually-selected screen object. A manual selection of a palette button, such as a second tap on the desired palette button, directs execution of the identified function. On the other hand, a gesture selection allows the designation of both a screen object and a function simultaneously. A gesture selection, such as drawing a line starting on a screen object and going in a certain direction, indicates the desired screen object from the starting point of the line and the desired function from the direction the line is drawn.

In order to manually select a screen object, a novice user would intuitively tap, or draw a point, on a screen object to select an electronic mail message. FIG. 3 shows details of the screen shown in FIG. 2 when a user performs a manual selection of a screen object according to a preferred embodiment. The electronic device preferably provides visual feedback to the user by highlighting the tapped area 310. Audio feedback may optionally be provided to the user. After a manual selection such as a single tap or a drawing of a point, the electronic device would automatically present the user with a directional palette preferably centering on the same area of the screen where the tap or point occurred.

FIG. 4 shows details of the screen shown in FIG. 2 when a directional palette appears according to a preferred embodiment. Directional palette 450 presents the user with a number of palette buttons. Although the directional palette 450 shown presents five palette buttons to the user, directional palettes may present more or less buttons as needed. The shape, size, and configuration of a directional palette depends on which screen object is selected. Each palette button has a unique direction relative to the center of the directional palette, which is preferably also the approximate location of the first tap; these directions may be referred to like compass directions. Each palette button also displays a function identifier stating or showing what function can be accessed by activating the palette button.

In this electronic mail example, a screen object represents a received mail message. Thus the directional palette 450 that appears when a received mail message screen object is manually selected has a palette button 451 to the north which accesses a cancel function. An alternate method of accessing this cancel function is to tap on a portion of the screen outside of the palette. The cancel function removes the present palette from the screen or otherwise undoes the most recent action. To the east, the user may select palette button 452 to forward the message to another recipient. To the south, palette button 453 directs deletion of the message, and to the west, palette button 454 prompts the user to reply to the sender of the message. Finally, center palette button 455 allows the user to read the message. Tapping on any of the palette buttons calls the function that is identified on the palette button.

In order to aid the user in learning and memorizing the available function options and their related gestures, the directional palette preferably presents function options as logically as possible. In this example, "reply" is to the west while "forward" is to the east. Thus, the user can intuit that a "reply" somehow travels backwards and a "forward" somehow travels forward.

Figure 5:
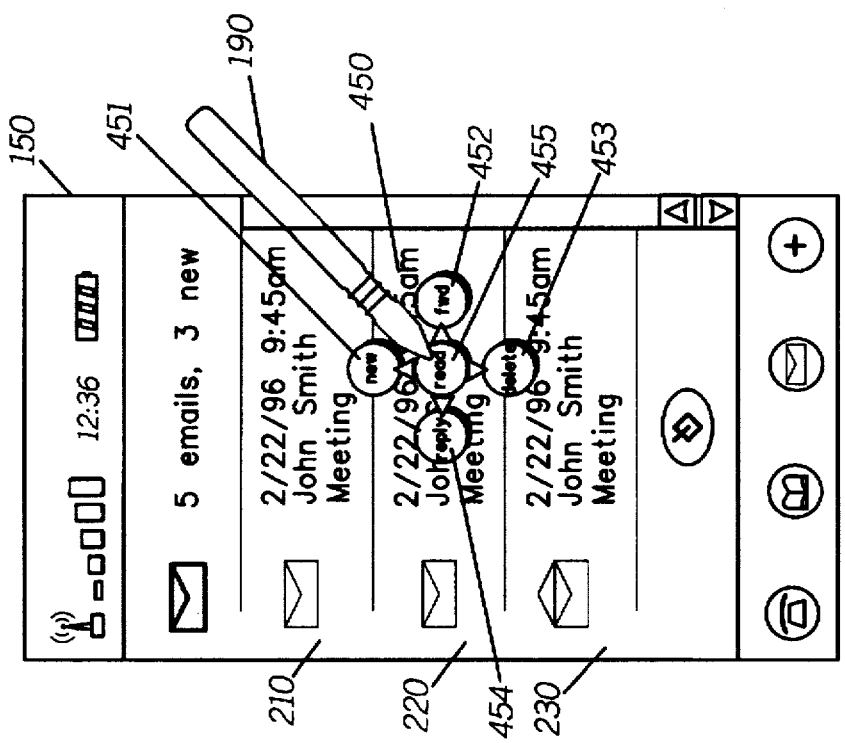
FIG. 5 shows details of the screen shown in FIG. 2 when a user performs a manual selection of a palette button on the directional palette shown in FIG. 4 according to a preferred embodiment.

FIG. 5 shows details of the screen shown in FIG. 2 when a user performs a manual selection of a palette button on the directional palette shown in FIG. 4 according to a preferred embodiment. A manual selection of a palette button is implemented using a second tap. After the center palette button 455 is tapped, the microprocessor temporarily highlights the palette button, as if it blinks, and the previous screen as shown in FIG. 2 is replaced by the selected electronic message screen. Thus, the second tap allows the user to read the message selected by the first tap. In this manner, the directional palette 450 teaches the user to "double-tap" to read a selected message.

Figure 6:
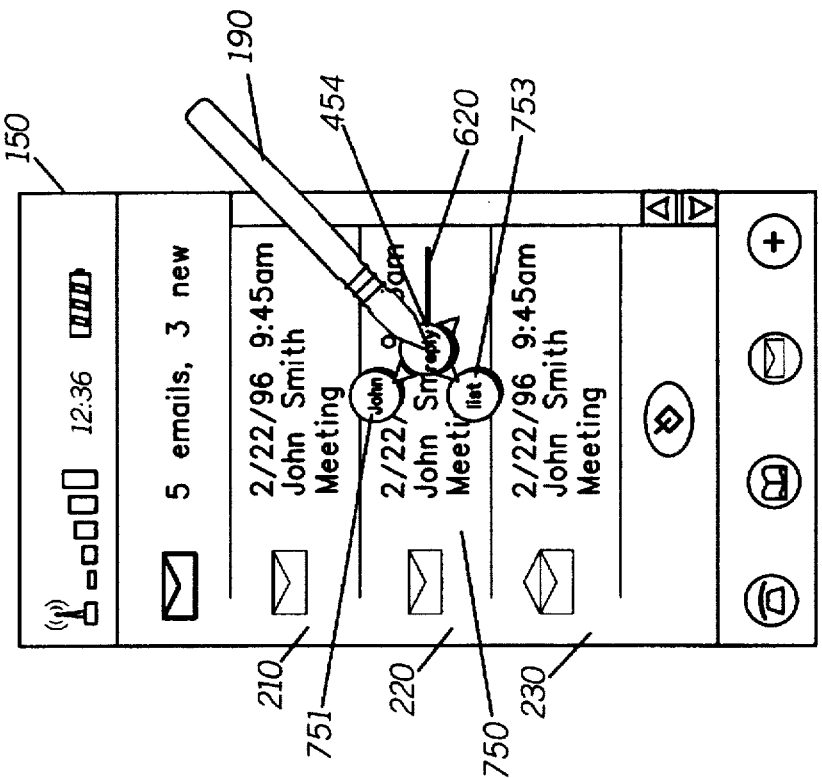
FIG. 6 shows details of the screen shown in FIG. 2 when a user performs a gesture selection of a screen object and a function according to a preferred embodiment.

Continuing with the directional palette shown in FIG. 5, a second tap to the left of the first tap, on the "reply" palette button, will bring up a reply screen. The corresponding gesture would be a line drawn from right to left as shown in FIG. 6. FIG. 6 shows details of the screen shown in FIG. 2 when a user performs a gesture selection of a screen object and a function according to a preferred embodiment. The gesture, a line drawn from right to left on screen object 220, is tracked using line 620 on the screen. Once the reply gesture is recognized by the microprocessor, the reply palette button 454 appears, blinks to provide visual feedback, and a reply screen appears exactly as the reply screen would appear if the user had manually selected the reply palette button from a directional palette. Note that the mental model for accessing a function is the same both for novice users and expert users. Thus, there is no longer a need for separate, redundant screen buttons for novice users.

Once a user has learned a gesture, the user no longer has to wait for a directional palette to appear in order to access available functions. Thus, the intuitive gesture-based graphical user interface teaches a novice user to gesture as a primary method for interacting with the device. By combining the directional palette with a gesture-based graphical user interface, the intuitive gesture-based graphical user interface explicitly depicts program functionality. Because, however, the user may interact with the device before a directional palette is presented, the intuitive gesture-based graphical user interface promotes more efficient use of the screen by providing the user with explicit function options only if they are needed. Furthermore, by providing the same mental model to both novice and expert users, the novice can more easily graduate to expert user status.

Figure 7:
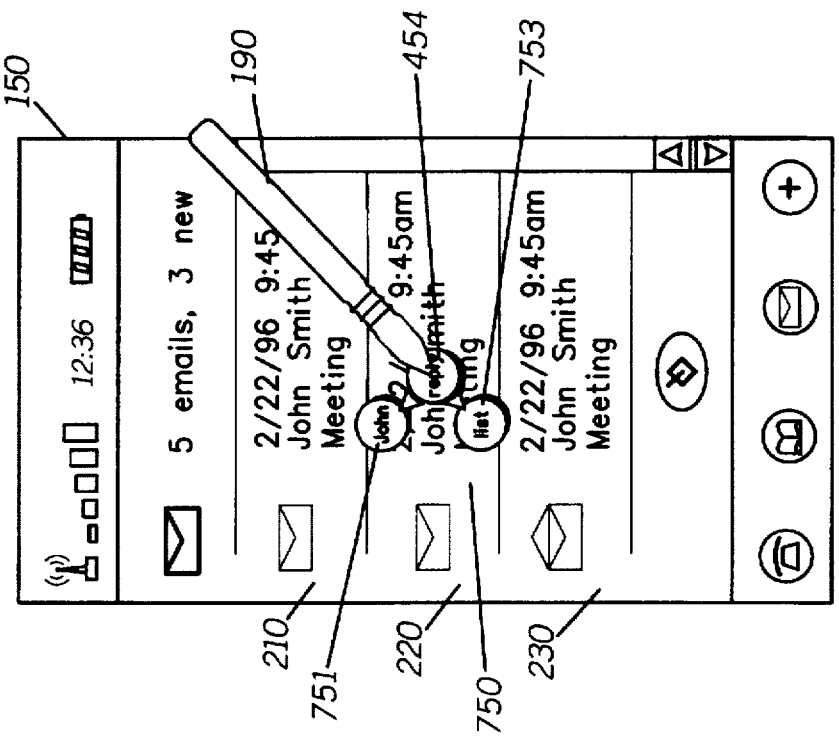
FIG. 7 shows details of the screen shown in FIG. 2 when a user performs a manual selection of a palette button on the directional palette shown in FIG. 4 according to another preferred embodiment.

FIG. 7 shows details of the screen shown in FIG. 2 when a user performs a manual selection of a palette button on the directional palette shown in FIG. 4 according to another preferred embodiment. Directional palettes may be "stacked" to create any number of gestures and accessible functions. A tap on the west palette button 454, which is labeled "reply," brings up a sub-palette 750. Sub-palette 750 provides only two palette buttons, a north-west palette button 751 to reply to the sender of the message and a south-west palette button 753 to select from a list of possible recipients. Sub-palettes 750 may be stacked indefinitely and contain any number of palette buttons.

Figure 8:
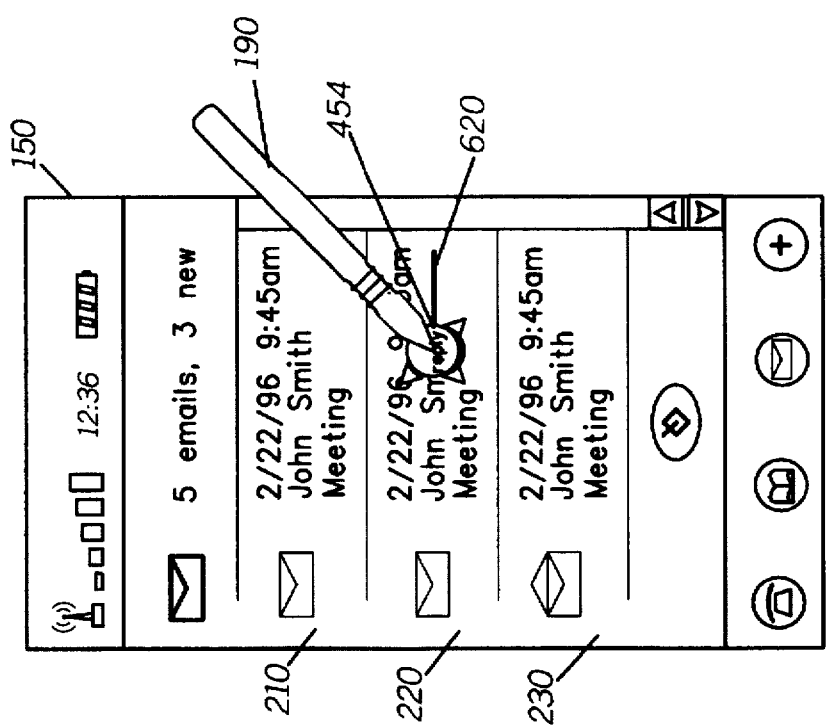
FIG. 8 shows details of the screen shown in FIG. 2 when a user performs a gesture selection of a screen object according to another preferred embodiment.

FIG. 8 shows details of the screen shown in FIG. 2 when a user performs a gesture selection of a screen object according to another preferred embodiment. In a stacked palette embodiment, a gesture selection may bring a user to a subpalette or straight to accessing a function. In this embodiment, gesture line 620 is made by a user and subpalette 750 appears. If, however, the gesture had continued with a north-west bend, the reply palette button 454 would first appear and blink, and then palette button 751 would appear and blink, and a reply screen addressed to the sender of the message, John, would replace the present screen. Thus, both a palette 450 and a subpalette 750 may be bypassed through the use of gestures.

Figure 9:
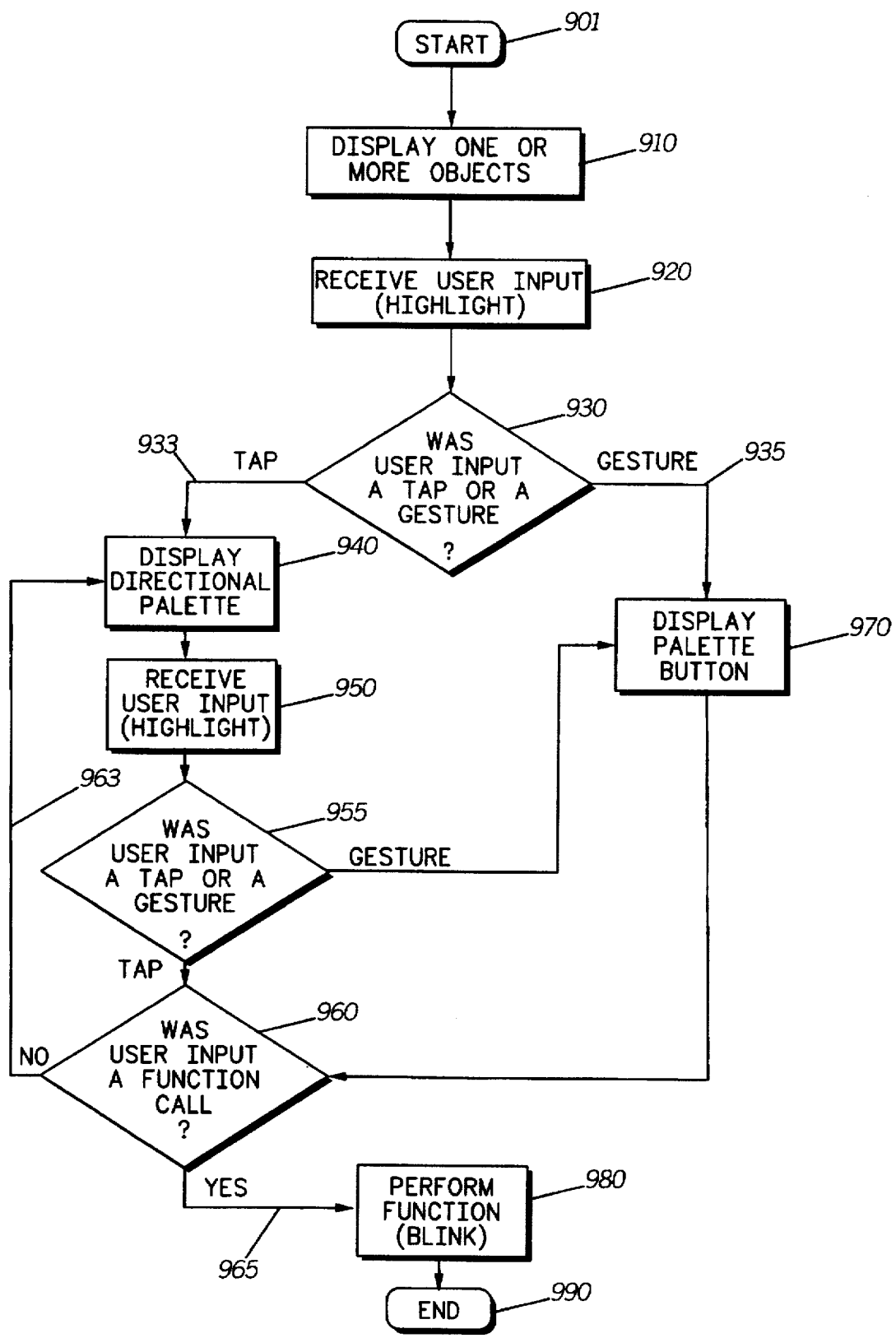
FIG. 9 shows a flow chart diagram of the operation of an intuitive gesture-based graphical user interface according to a preferred embodiment.

FIG. 9 shows a flow chart diagram of the operation of an intuitive gesture-based graphical user interface according to a preferred embodiment. After the start step 901, the electronic device displays one or more objects as shown in step 910. The device then waits for a user input as shown in step 920. When a user input is received, a portion of the screen is highlighted to provide visual feedback to the user. The machine could also provide audio feedback to the user. The device evaluates whether the received user input was a manual selection or a gesture selection of a screen object as shown in step 930. If the user input is determined to be a manual selection (e.g., a tap), shown by branch 933, the device displays a directional palette as shown in step 940. Again, the devices waits for a user input and highlights user input as shown in step 950 and evaluates whether the received user input was a tap or a gesture as shown in step 955.

If the next user input is a tap, the microprocessor evaluates whether the user input was a function call as shown in step 960. If the next user input was a gesture, the selected palette button is displayed as visual feedback as shown in step 970 and then the microprocessor evaluates whether the user input was a function call as shown in step 960. Again, audio feedback may also be used to acknowledge the gesture selection.

If the user input was not a function call as evaluated in step 960, the device returns to step 940 and displays a next directional palette (i.e., subpalette). Loop 963 allows a stacked palette effect and may be performed as many times as necessary until a user input is a function call as shown by branch 965. Once a function call is selected, the device blinks the selected palette button and the microprocessor performs the function as shown in step 980.

Returning to step 930, if the initial user input is determined to be a gesture selection, as shown in branch 935, the device displays the palette button selected by the gesture selection in step 970 to provide visual feedback to the user. Then, the device goes directly to step 960 to determine whether the gesture was a function call. Once a selected function is performed, the end step 990 occurs and the device may return to the start step 901.

As an option, the timing of the appearance of the directional palette may vary to motivate a novice user to use gesture selections rather than simply wait for the directional palette to appear before making a second tap. For instance, when a device is first used, the directional palette appears quickly in reaction to a single tap. The quick appearance of the directional palette allows the user to learn the available functions and their corresponding gestures at the outset. As the user learns to make a second tap in certain directions to activate certain functions, the directional palette takes longer and longer to appear after the first tap has occurred. Thus, an impatient user will be inclined to make a second tap before the directional palette appears. Once the user either taps twice or draws a line before a directional palette appears, the user has employed a gesture selection but without making any concerted effort to memorize the gesture. If a user forgets a gesture, the user merely needs to wait until the directional palette appears on the screen after the first tap to relearn the gesture and related function.

Thus, an intuitive gesture-based graphical user interface quickly and easily teaches users gestures for interacting with a microprocessor-controlled electronic device. While specific components and functions of the intuitive gesture-based graphical user interface are described above, fewer or additional functions could be employed by one skilled in the art within the true spirit and scope of the present invention. The invention should be limited only by the appended claims.

I claim:

1. A method for providing a microprocessor-controlled intuitive gesture-based graphical user interface for an electronic device having a screen comprising the steps of:

A) displaying a screen object on the screen;

B) receiving a user input corresponding to a selection of the screen object and evaluating the user input as either corresponding to a manual selection or corresponding to a gesture selection;

C) if the user input corresponds to a manual selection, performing the steps of:

1) automatically presenting on the screen a directional palette, the directional palette having at least one palette button, each at least one palette button each having a unique compass direction and a unique function identifier; and 2) receiving a next user input corresponding to a selection of the at least one palette button; and D) if the user input corresponds to a gesture selection, performing the steps of:

1) providing a user feedback acknowledging the gesture selection;

2) determining if the user input is a function call;

3) if the user input is a function call, performing a function; and 4) if the user input is not a function call, returning to the step of automatically presenting on the screen a directional palette (step C) 1)).

2. A method for providing a microprocessor-controlled intuitive gesture-based graphical user interface for an electronic device having a screen according to claim 1 wherein the user feedback is a visual feedback.

3. A method for providing a microprocessor-controlled intuitive gesture-based graphical user interface for an electronic device having a screen according to claim 2 wherein the user feedback is a temporary palette button.

4. A method for providing a microprocessor-controlled intuitive gesture-based graphical user interface for an electronic device having a screen according to claim 1 wherein the user feedback is an audio feedback.

5. A method for providing a microprocessor-controlled intuitive gesture-based graphical user interface for an electronic device having a screen according to claim 1 further comprising the step of:

waiting for a variable time period before the step of automatically presenting on the screen a directional palette (step C) 1)).

6. A method for providing a microprocessor-controlled intuitive gesture-based graphical user interface for an electronic device having a screen according to claim 1 wherein the user input corresponding to a manual selection is a drawing of a point.

7. A method for providing a microprocessor-controlled intuitive gesture-based graphical user interface for an electronic device having a screen according to claim 1 wherein the user input corresponding to a gesture selection is a drawing of a line.

8. A method for providing a microprocessor-controlled intuitive gesture-based graphical user interface for an electronic device having a screen according to claim 1 further comprising the step of:

providing visual feedback after the step of receiving a user input (step B)).

9. A method for providing a microprocessor-controlled intuitive gesture-based graphical user interface for an electronic device having a screen according to claim 1 further comprising the step of:

providing audio feedback after the step of receiving a user input (step B)).

10. A method for providing a microprocessor-controlled intuitive gesture-based graphical user interface for an electronic device having a screen according to claim 1 further comprising the steps of:

C)
3) evaluating the next user input as either corresponding to a manual selection or corresponding to a gesture selection;
4) if the next user input corresponds to manual selection, performing the steps of:
5) determining if the next user input is a function call;
6) if the next user input is a function call, performing a function; and
7) if the next user input is not a function call, returning to the step of automatically presenting on the screen a directional palette (step C) 1)).

11. A method for providing a microprocessor-controlled intuitive gesture-based graphical user interface for an electronic device having a screen according to claim 10 further comprising the steps of:

D) if the user input corresponds to a gesture selection, performing the steps of:
1) providing a user feedback acknowledging the gesture selection;
2) determining if the user input is a function call;
3) if the user input is a function call, performing a function; and
4) if the user input is not a function call, returning to the step of automatically presenting on the screen a directional palette (step C) 1)).

12. A method for providing a microprocessor-controlled intuitive gesture-based graphical user interface for an electronic device having a screen according to claim 11 wherein the user feedback is a visual feedback.

13. A method for providing a microprocessor-controlled intuitive gesture-based graphical user interface for an electronic device having a screen according to claim 12 wherein the user feedback is a first temporary palette button.

14. A method for providing a microprocessor-controlled intuitive gesture-based graphical user interface for an electronic device having a screen according to claim 11 wherein the user feedback is an audio feedback.

15. A method for providing a microprocessor-controlled intuitive gesture-based graphical user interface for a radiotelephone having a screen comprising the steps of:

A) displaying a screen object on the screen;
B) receiving a user input corresponding to a selection of the screen object and evaluating the user input as either corresponding to a manual selection or corresponding to a gesture selection;
C) if the user input corresponds to a manual selection, performing the steps of:
1) automatically presenting on the screen a directional palette, the directional palette having at least one palette button, each at least one palette button each having a unique compass direction and a unique function identifier;
2) receiving a next user input corresponding to a selection of the at least one palette button and evaluating the next user input as either corresponding to a manual selection or corresponding to a gesture selection;
3) if the next user input corresponds to a manual selection, performing the steps of:
4) determining if the next user input is a function call;
5) if the next user input is a function call, performing a function;
6) if the next user input is not a function call, returning to the step of automatically presenting on the screen a directional palette (step C) 1));
D) if the user input corresponds to a gesture selection, performing the steps of:
1) providing a user feedback acknowledging the gesture selection;
2) determining if the user input is a function call;
3) if the user input is a function call, performing a function; and
4) if the user input is not a function call, returning to the step of automatically presenting on the screen a directional palette (step C) 1)).

16. A method for providing a microprocessor-controlled intuitive gesture-based graphical user interface for a radiotelephone having a screen according to claim 15 further comprising the steps of:

C)
7) if the next user input corresponds to a gesture selection, performing the steps of:
1) providing a user feedback acknowledging the gesture selection;
2) determining if the next user input is a function call;
3) if the next user input is a function call, performing a function; and
4) if the next user input is not a function call, returning to the step of automatically presenting on the screen a directional palette (step C) 1)).

* * * * *